June 17, 1958 C. E. HICKMAN 2,839,069
PORTABLE ICE FISHING SHELTER
Filed Feb. 1, 1954 3 Sheets-Sheet 1
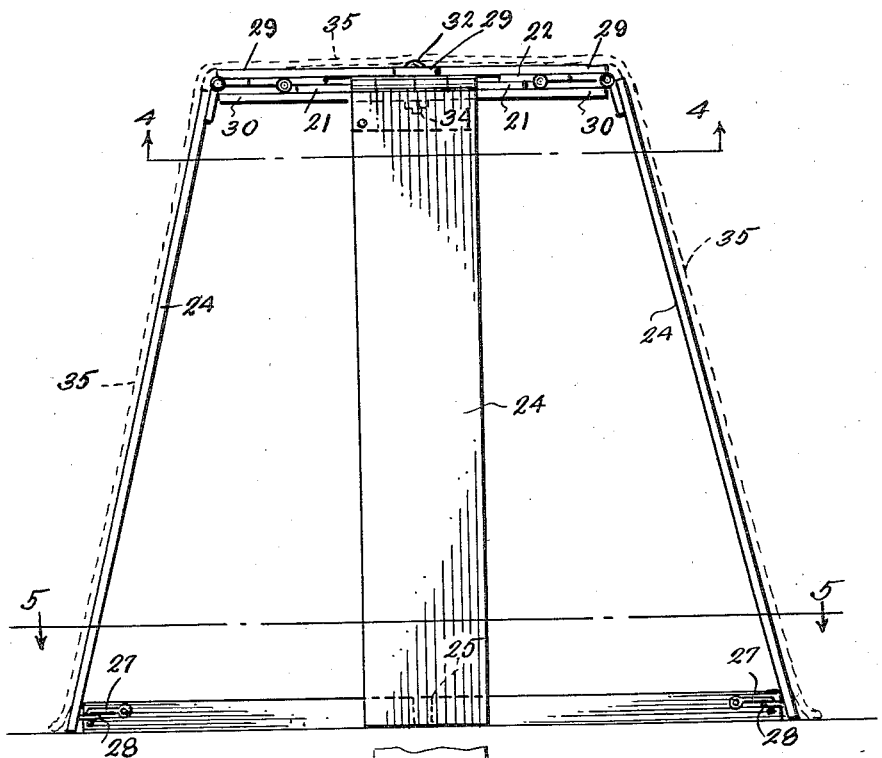
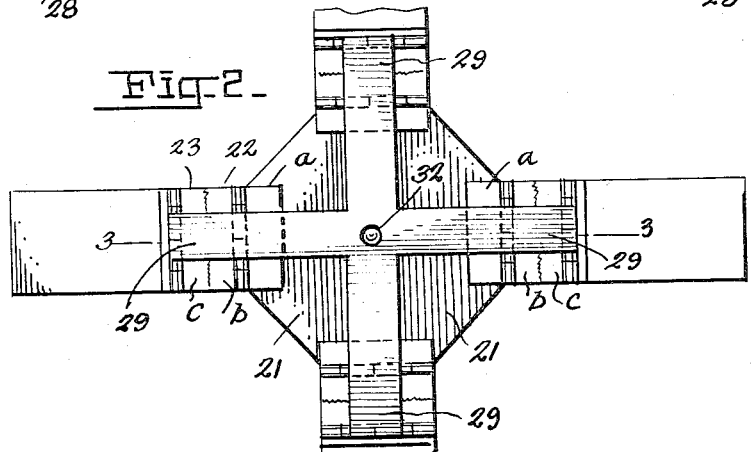
INVENTOR.
CHARLES E. HICKMAN
BY Patrick D. Beaver
ATTORNEY June 17, 1958 — C. E. HICKMAN — 2,839,069
PORTABLE ICE FISHING SHELTER
Filed Feb. 1, 1954 — 3 Sheets-Sheet 2
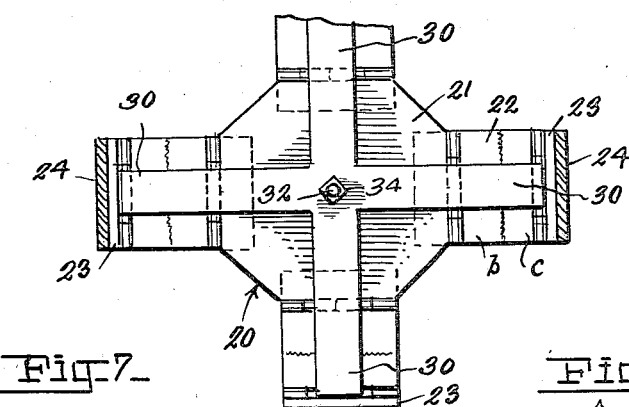
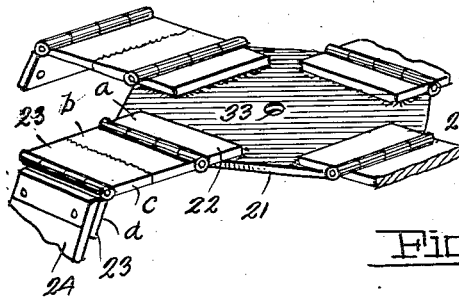
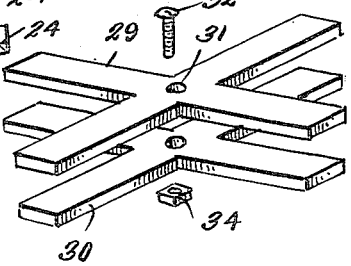
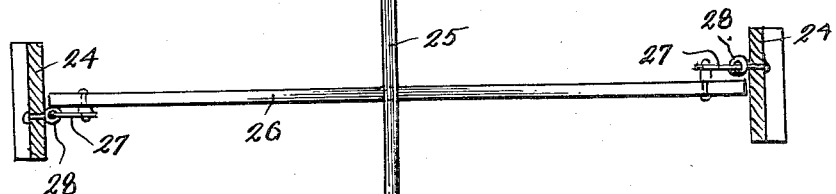
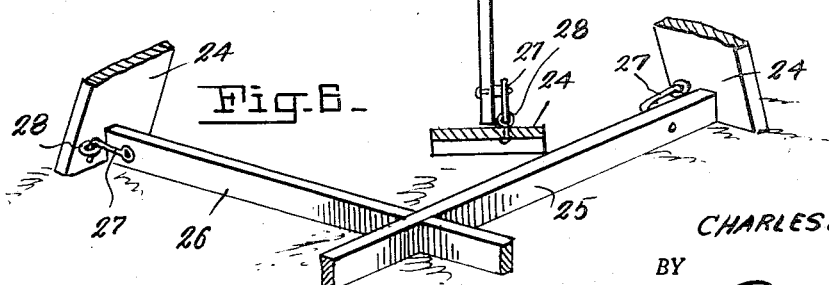
INVENTOR.
CHARLES E. HICKMAN
BY Patrick D. Beavers
ATTORNEY June 17, 1958     C. E. HICKMAN     2,839,069
PORTABLE ICE FISHING SHELTER
Filed Feb. 1, 1954     3 Sheets-Sheet 3
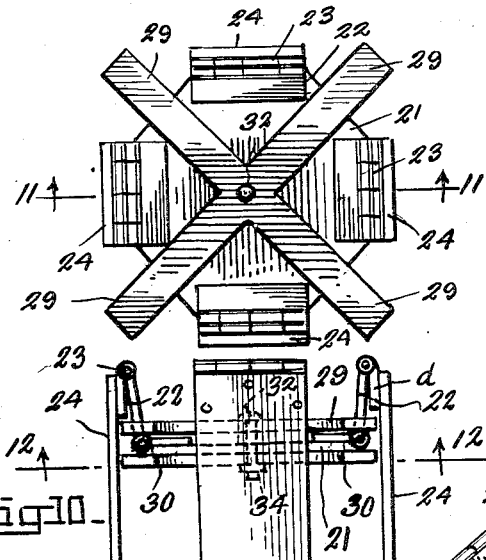
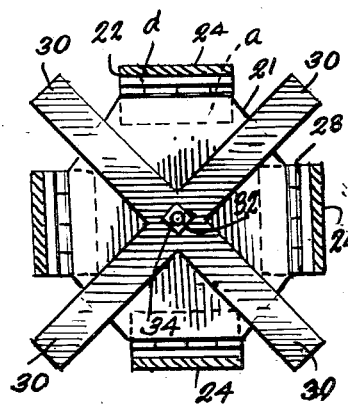
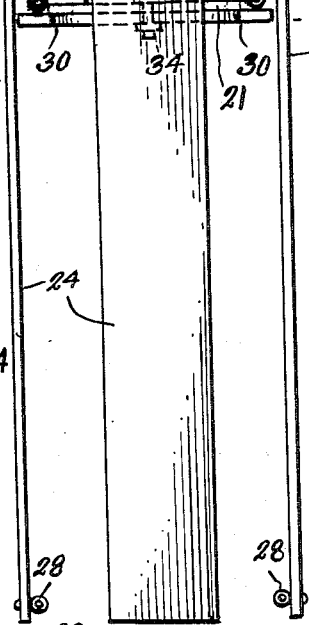
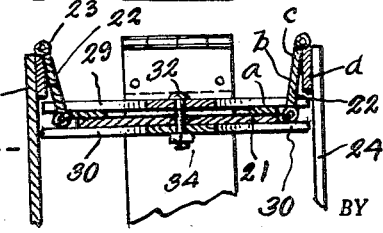
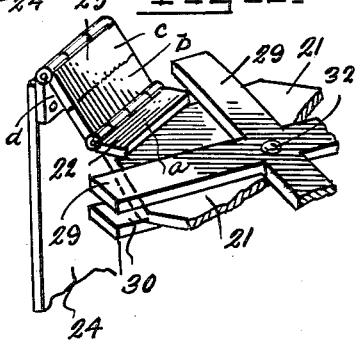
INVENTOR.
CHARLES E. HICKMAN
BY
*Patrick D Beavers*
ATTORNEY United States Patent Office 2,839,069
Patented June 17, 1958

2,839,069
PORTABLE ICE FISHING SHELTER

Charles E. Hickman, Saranac, Mich.

Application February 1, 1954, Serial No. 407,477

1 Claim. (Cl. 135—4)

This invention relates to improvements in shelters such as are used in ice fishing. In northern climes, ice fishing is not only a sport but an occupation, especially in the fishing for sturgeon and perhaps other fish having a high retail sale price.

The principal object of the present invention is to provide a shelter for ice fishing which can be readily transported in collapsed condition to the fishing site and then set up in a few minutes time, to provide adequate shelter against wind and inclement weather.

Another important object of the invention is to provide a collapsible ice fishing shelter which can be readily carried in an automobile to any desired fishing site and placed on the ice very conveniently, whereas heretofore such shelters are generally harbored at points along the shore of the particular body of water and are not readily transportable.

Still another object of the invention is to provide a shelter of this character, which can be manufactured and retailed at a reasonably low monetary figure.

These and various other objects and advantages of the invention will become apparent to the reader of the following description.

In the drawings:

Figure 1 is a side elevational view of the assembled structure, but showing the canvas cover in broken line.

Figure 2 is a top plan view of the structure shown in Figure 1, without the canvas covering.

Figure 3 is a fragmentary vertical sectional view taken on line 3—3 of Figure 2.

Figure 4 is a section taken on line 4—4 of Figure 1, looking upwardly.

Figure 5 is a section taken on line 5—5 of Figure 1, looking downwardly.

Figure 6 is a fragmentary perspective view showing the lower portions of the props and the crossed brace members.

Figure 7 is a fragmentary perspective view of the head structure with the clamp members removed.

Figure 8 is an exploded perspective view of the clamp members.

Figure 9 is a top plan view of the head structure with the clamp members moved to hinge cleared position.

Figure 10 is a side elevational view of the frame structure collapsed.

Figure 11 is a section taken on line 11—11 of Figure 9.

Figure 12 is a sectional view taken on line 12—12 of Figure 10, looking upwardly.

Figure 13 is a fragmentary perspective view of the structure shown adjusted in Figure 9.

Referring to the drawings wherein like numerals designate like parts, it can be seen that numeral 20 generally refers to a head structure and this includes a polygonal shaped plate 21 on which at four equally distinct points thereon are welded or otherwise secured hinges 22. These hinges includes inner and outer leaves a, b and the outer leaves b are affixed to the inner leaves c of complemental hinges 23.

The outer leaves d are welded or otherwise secured to props 24, which serve to support the structure in an upright position.

The shelter has a base structure which is actually a pair of crossed brace members 25, 26 and the ends of these brace members carry swingable hooks 27 which engage in eyes 28 on the lower ends of the props 24 to hold the props against spreading or contraction.

The head structure further consists of a pair of cross-shaped clamps 29, 30 which define arms and extend over and above the inner hinges 22, as is clearly shown in Figure 4. The center portions of the clamp members 29, 30 are formed with openings 31 to receive a bolt 32. The center of the head plate 21 is likewise formed with an opening 33 and the bolt extends downwardly through the openings 31 and 33 and is equipped with a nut 34.

Obviously when the arms of the clamps 29, 30 are disposed over the inner hinges 22, the hinges cannot swing upwardly and permit the frame structure to collapse. As a matter of fact the inner hinge structures are retained inactive. However, when the clamps 29, 30 are rotated to the position shown in Figure 9, the inner hinges 22 are freed so that when the braces 25, 26 are removed, the props 24 can be hinged upwardly to the position shown in Figure 10. This allows for a compact collapsed disposition of the parts of the frame, permitting the same to be placed conveniently in an automobile and transported from one point to another.

The entire structure has a canvas covering denoted by numeral 35 and of course this covering can have an opening therein to form an entrance. This covering simply slips over the entire framework and when removed can be rolled into a small compact form.

As is usual, the hole in the ice is dug and the assembled shelter then slide over the opening and within the shelter, the fisherman is protected from wind and bad weather.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A frame for a portable ice fishing shelter comprising a base formed of a pair of crossed brace members and having a centrally disposed opening, a head plate, four inner hinges equidistantly affixed to the peripheral portion of said head plate, said inner hinges each having an inner and an outer leaf, four outer hinges each having an inner and an outer leaf and each having its inner leaf affixed to the outer leaf of one of said inner hinges, props each affixed at one end to each of the outer leaves of the outer hinges, and each detachably connected at its other end to an outer end portion of one of said brace members, a cross-shaped clamp having a central opening mounted below said head plate, a similar clamp mounted above said head plate, and a bolt extending through the openings in said clamps and said head plate, said clamps defining arms normally encompassing said inner hinges and the inner plate of each of said outer hinges whereby the entire structure is rigidly maintained as a unit, and whereby said arms may be rotated to positions between adjacent interconnected hinges to permit movement of said props to a parallel collapsed position.

References Cited in the file of this patent

UNITED STATES PATENTS

| | | |
|---|---|---|
| 539,226 | Lorenz | May 14, 1895 |
| 1,326,006 | Sterhardt | Dec. 23, 1919 |
| 1,385,615 | Hammond | July 26, 1921 |
| 1,588,391 | Berry | June 8, 1926 |
| 1,772,646 | Strombeck | Aug. 12, 1930 |
| 2,425,279 | Harris | Aug. 5, 1947 |